United States Patent [19]

Horn

[11] Patent Number: 5,766,378
[45] Date of Patent: Jun. 16, 1998

[54] STAINLESS STEEL SURFACE CLADDINGS OF CONTINUOUS CASTER ROLLS

[75] Inventor: Bruce D. Horn, Johnstown, Pa.

[73] Assignee: AG Industries, Inc., Coraopolis, Pa.

[21] Appl. No.: 554,140

[22] Filed: Nov. 6, 1995

[51] Int. Cl.$^6$ .................................................. C21D 9/36
[52] U.S. Cl. ........................... 148/526; 148/528; 148/529
[58] Field of Search ........................... 148/520, 521, 148/524, 526, 528, 529

[56] References Cited

U.S. PATENT DOCUMENTS

| | | | |
|---|---|---|---|
| 4,110,514 | 8/1978 | Nicholson | 428/683 |
| 4,464,209 | 8/1984 | Taira et al. | 148/521 |
| 4,482,612 | 11/1984 | Kurokii et al. | 428/683 |
| 4,484,959 | 11/1984 | Boucher et al. | 148/524 |
| 4,701,584 | 10/1987 | Rylicki | 219/10.57 |
| 5,403,994 | 4/1995 | Havas et al. | 219/645 |

FOREIGN PATENT DOCUMENTS

| | | | |
|---|---|---|---|
| 53-66817 | 6/1978 | Japan | 148/520 |
| 61-235516 | 10/1986 | Japan | 148/529 |
| 63-47337 | 2/1988 | Japan | 148/529 |
| 4-178251 | 6/1992 | Japan | 148/526 |

OTHER PUBLICATIONS

"Mechanisms of Surface Deterioration —Cladded Rolls for Continous Slab Casting —Phase I"; Chudzicki, et al., published with *Proceedings of Aime Technical Conference*, Oct. 18, 1994.

*Primary Examiner*—George Wyszomierski
*Attorney, Agent, or Firm*—Woodcock Washburn Kurtz Mackiewicz & Norris LLP

[57] ABSTRACT

A heat-treated cladding on the working surfaces of continuous caster rolls reduces sensitization zones. The thermal treatment applied conditions the working surface of the roll substantially uniformly at all positions around the perimeter of the roll, thereby dissolving carbide formations into a austenite solution and removing carbide formations and chromium depletion sites or sensitized zones associated with the reheat regions occurring during the welding process. The heat treatment process is accomplished without thermally affecting or altering the properties and dimensions of the base roll material, either at a substantial depth beneath the body working surface or on or beneath the roll journal surfaces.

14 Claims, 1 Drawing Sheet

STAINLESS STEEL SURFACE CLADDINGS OF CONTINUOUS CASTER ROLLS

TECHNICAL FIELD

The present invention relates generally to caster rolls and more specifically to their cladded outer surfaces.

BACKGROUND OF THE INVENTION

Rolls, known as "caster rolls," are used in the casting of molten metal. Caster rolls are a series of containment rolls or rollers which contain and support a solidifying slab of metal and transport it through a path. As molten metal issues from a continuous casting mold, it is supported by the caster rolls which "bend" the molten ribbon to the horizontal position and convey it to a table, fully solidified.

Caster rolls are required to operate in a severe hostile service environment which subjects the rolls to cyclic thermal shock, thermal and mechanical bending stresses and elevated temperature abrasion. The temperature of the solidifying slab at the first caster roll may exceed 1204° C. Also, the solidifying slab is rapidly quenched as it moves between the caster rolls, producing rapid thermal excursions in the rolls. All of these actions are occurring while the roll is in a highly corrosive aqueous environment of the cooling water which contains acids and/or bases from the flux and water treatment chemicals. Moreover, while the roll is in contact with the solidifying slab, the roll is elongating at that contact position such that the rolls are continuously undergoing tension-compression cycles.

The rolls generally range from 15 cm OD to 48 cm OD and have a body length of 25 cm to 230 cm. The rolls are typically hollow and have a center bore for water cooling of the roller bearings.

To extend caster roll life in this severe service environment, the working surface of caster roll bodies are generally weld surfaced or cladded with alloys having superior resistance to the harmful effects of the service environment as compared to the base alloy steel roll material. In other words, caster rolls have an outer protective cladding or continuous outer working surface that is approximately 0.1 to 2.5 cm in thickness. Thus, the roll is a composite or bimetallic structure. Due to the narrow tolerances required to control slab thickness and solidification, the roll diameter must not vary more than about 0.05 cm. When wear, thermal shock or corrosion produces even a small change in the roll surface, the casting operation must shut down. The assembly of rolls (typically 8 to 16 rolls in a segment) is then removed and the affected rolls are remachined and/or re-weld surfaced.

Surfacing of caster rolls has been performed with nickel base, cobalt base, iron base and stainless steel type alloys. Most typically, the cladding is martensitic stainless steel. As will be appreciated by those skilled in the art, the microstructure of stainless steel alloys and other materials is adversely affected by the heat input and cooling rate associated with surface cladding processes. This results in microstructure change, segregation and zones of deposit non-uniformity that affect service performance, as will be explained more fully hereinafter.

The primary cause of roll surface deterioration has been identified as cracking which propagates from nucleation sites (which are called "corrosion pits") that are preferentially located in the reheat regions adjacent to the weld interbead areas.

More specifically, the claddings are typically formed by either welding a continuous bead of material around the circumference of the roll body or welding longitudinal beads along the roll body. First, the roll is heated to about 260°–370° C. As the bead is applied it cools and bonds to the roll surface (the rolls are typically heat-treated forged steel). As those skilled in the art will appreciate, after the roll is circumscribed by the first weld bead, the next revolution of the welding torch is spaced slightly to one side of the first bead such that the new bead slightly overlaps the solidified bead from the previous rotation. Each bead is typically about 1.3 cm to 7.6 cm in width. This application of material is continued at a uniform thickness or depth until the entire roll surface is coated. Multiple layers of the weld bead are typically applied. For example, three complete weld layers are needed to produce a finished cladding having a depth of about 0.6 cm. Also, the compositional characteristics of each weld layer may vary.

After the beads are applied, the surfacing cools to room temperature to facilitate microstructure transformation, the roll is tempered to soften the overlay and relieve stresses and then the welded surface is machined to obtain a smooth, uniform surface. Analysis has shown that the reheat regions contain chromium carbides which have formed at prior austenite grain boundaries. That is, as a molten bead overlaps a solidified bond, the carbon and chromium that are in solid solution come out of solution as carbide precipitates, forming a chromium depleted zone. In addition, as the second layer of weld bead is applied over the first layer, another area of precipitation/depletion is produced. In effect, circumferential and parallel planes of chromium depletion are produced throughout the cladding. This process is sometimes referred to as sensitization. The zones of chromium depletion result in the formation of anodic regions that are prone to corrosive attack and loss of passivation.

The heat treatment of various metals to improve various properties has been in use for many centuries. In particular, it has long been a part of the art of metallurgy and metal working to apply heat in a controlled way (such as a furnace), and to control the rate of cooling (such as by means of rapid cooling in water). Such processes are known to alter the microscopic structure of the metal or alloy being processed in such a way as to cause beneficial properties to be enhanced. The microstructure of the material may be altered by such heat treatment to create a beneficial structures.

In general, heat treatment is performed as a means for case hardening a region of the surface of such workpiece which will be subject to particular wear when the workpiece is put to use in its intended application. While heat treatment hardens the region of the workpiece against expected wear, it also tends to make the region of treatment brittle. Also, heat treatment tends to distort the workpiece from its original shape, thereby increasing the need for later reworking, causing the workpiece no longer to meet the dimensional tolerances required.

The working surfaces of non-cladded forged steel rolls for cold rolling applications have been surface hardened (to a depth of approximately 2.5 cm) by induction heat treatment since its introduction for roll application in 1927. This practice is widely employed today throughout the world. In addition, cast and forged steel work rolls and back-up rolls have been surface hardened or differentially hardened to depth of 7.5 cm by both induction and oxy-fuel furnace hardening. To applicant's knowledge, however, these processes have never been applied to cladded caster rolls as provided in the present invention.

Induction heat treatment has proven itself to be a versatile engineering tool, widely used in many industries to increase the wear resistance of critical components of machinery. Induction heat treatment makes use of the basic fact that a time-varying magnetic field induces an electric field (Faraday's Law). When a conductor, such as the workpiece, is placed in an electric field, currents will flow through the conductor in the direction of the electric field in direct proportion to the strength of the electric field and in inverse proportion to the electrical resistance of the conductor (Coulomb's and Ohm's Law). The resistance of the workpiece to current flow will cause the workpiece to heat, leading to the desired heat treatment effect.

The present invention focuses on a unique application of induction heating to a controlled time, temperature and depth in order to solution anneal stainless steel surface cladding on a roll and to control the rate of cooling such that carbide formations and precipitates are uniformly dispersed throughout the matrix of the structure, thereby avoiding the formation of chromium carbides at the former austenite grain boundaries.

SUMMARY AND OBJECTS OF INVENTION

In one aspect, the present invention provides a cladded roll wherein the cladding is substantially free of sensitization regions.

In another aspect, the present invention provides a method of forming a cladded roll which includes the steps of forming a weld cladding on the rolling surface of a roll, the cladding having multiple regions of chromium depletion; heating said weld cladding to a temperature sufficient to dissolve carbide formations into an austenite solution and remove carbide formations and chromium depletion zones; and quench and/or control cool the cladding to create a microstructure which has a significantly reduced number of sensitization regions.

In still another aspect, the heat treatment of the present invention is carried out by scanning an induction coil across the surface of the cladding to selectively heat only a portion of the cladding and than quenching and/or control cooling the selectively heated cladding portions.

Thus, it is a primary object of the invention to eliminate or minimize sensitized microstructures in the reheat regions adjacent to weld interbead areas on the surface cladded rolls.

Another object is to provide a substantially sensitization-free cladding across the entire roll body length using induction heating.

Still another object of the invention is to provide a substantially sensitization-free roller cladding without adversely affecting the dimensional accuracy of the finish machined roll.

Another object of the present invention is to provide a substantially sensitization-free roller cladding to a sufficient depth such that a used roll surface can be machined to a smaller size, generally not exceeding 1.3 cm of diameter reduction, without the need to reheat treat the working surface.

Another object of the present invention is to provide a substantially sensitization-free roller cladding having a sufficient depth such that the strength and toughness of the heat-affected zone (HAZ) which lies below the fusion zone between the surface cladding and base roll material is optimized for the intended application involving low cycle fatigue and high bending stresses.

Another object of the present invention is to provide a method for heat treatment of used caster roll surfaces where it is determined that elevated temperatures encountered in service have caused microstructural instability and sensitization to occur.

Another object of the present invention is to provide a method for heat treatment of used caster roll surfaces where it is determined that exposure to elevated temperature in service has caused softening of the roll working surface, therefore, re-hardening the roll surface to avoid premature wear.

Another object of the invention is to provide a substantially sensitization-free roller cladding such that the cladding is in compression rather than in tension, thereby making the working surface of the roll more resistant to crack nucleation and propagation under fatigue loading.

Another object of the invention is to provide a method of forming a sensitization-free roller cladding where the roll body is heat treated to thereby isolate thermal effects to the body and avoid scale formation and decarburization on the finished machined surfaces of the bearing journals.

DETAILED DESCRIPTION OF THE PREFERRED EMBODIMENTS OF THE INVENTION

Figure 2:
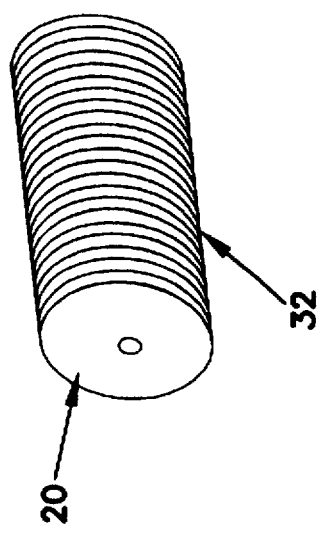
FIG. 2 is a perspective view of a bead welded roll.
Figure 1:
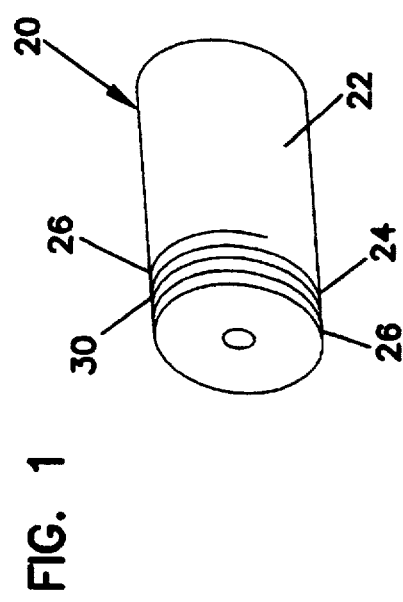
FIG. 1 is a perspective view of a bead welded roll in an intermediate stage in accordance with the present invention.

Referring now to FIG. 1 of the drawings caster roll 20 is shown having continuous cylindrical surface 22. Bonded to a portion of surface 22, bead weld 24 is shown in an intermediate stage of construction. Although the present invention is particularly suited for use with caster rolls of the type which support solidifying metal such as steel or the like issuing from a continuous casting mold, other rolls such as table, tension, pinch and hot and cold work rolls may also be used in the present invention. Roll 20 will generally have a diameter of from 15 to 48 centimeters and a length of from about 25 to 230 centimeters. As previously described, roll 20 is generally hollow and incorporates one or more coolant passages primarily for the cooling of bearings. Bead 24 extends around the circumference of roll 20 at surface 22 in a continuous manner and is applied in a progressive welding operation utilizing a process such as submerged arc, or open-arc, or gas shielded, or electroslag, or electron beam or laser. The individual lateral bead surface 26 (that is, each bead) will generally be from about 1.3 cm to 7.6 cm in width and from about 0.13 cm to about 0.32 cm in thickness or depth measured outwardly from surface 22. Surface 22 will typically be heat-treated forged steel and the wall of roll 20 which forms surface 22 will typically have a thickness of about 7.6 cm to about 21.6 cm. After roll 20 is circumscribed by the first weld bead 28 the continuous welder is shifted such that the second round of bead, bead 30, slightly overlaps bead 28 with the overlap region being from about 0.3 cm to about 1.3 cm. It is to be understood that weld bead 26 solidifies almost immediately after it contacts surface 22. This process is continued at a uniform rate and thickness until the entire roll surface 20 is coated with a weld bead layer 32 as best shown in FIG. 2 of the drawings. Other cladding techniques may also be suitable.

In many instances, in order to form a final cladding layer of appropriate thickness, the continuous bead welding operation is then repeated such that a second and possibly third bead weld surface is applied one on top of the other. A number of alloys can be used as bead weld 26 such as nickel alloys, cobalt alloys, iron alloys and stainless steel type alloys. Most preferred for use in the present invention is a stainless steel alloy such as 410 or 414 or 420 or 423SS. It may be desirable in some applications to vary the composition of the multiple layers of the weld bead, that is, use a different alloy for the first, second and third bead weld layers, in order to optimize use of materials and surface characteristics of the cladding. In most applications, bead weld layer or weld cladding 32 will be built up to a thickness on surface 22 of approximately 0.25 cm to about 1.30 cm. As will be described more fully hereinafter, some of surface 32 is removed by machining in subsequent stages of the operation.

It has been found that as the molten bead weld contacts and reheats the previously solidified bead weld, chromium in the solid solution precipitates to form carbides resulting in a chromium depleted zone. These chromium depleted zones are referred to herein as "sensitization" zones or regions. Thus cladding 32 has a number of regions, including circumferential regions that are sensitized that are thus prone to corrosive attack and loss of material. As used herein, "substantially sensitization zone free" or the like shall mean a microstructure whereupon the carbide formations are both stabilized and uniformly distributed throughout the matrix without the presence of chromium depleted zones having origin related to the cladding process.

Figure 3:
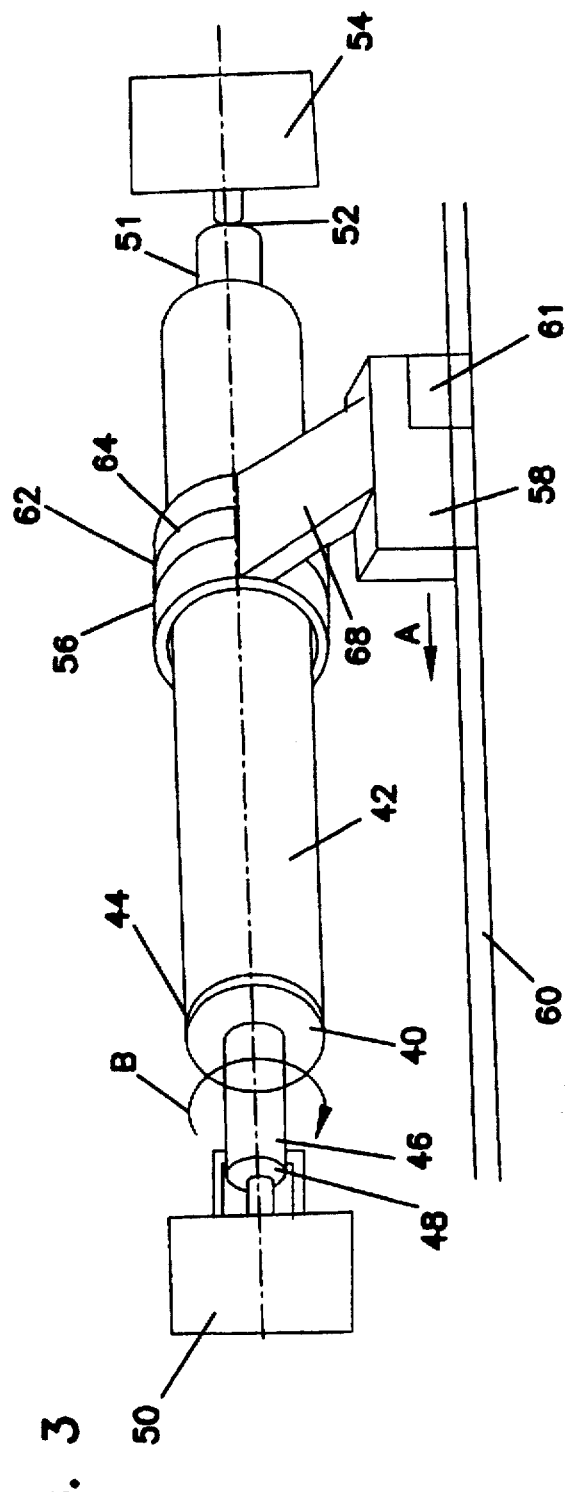
FIG. 3 is a diagrammatic view of the general arrangement of the apparatus used to heat treat the surface cladding of a caster roll by induction heating in accordance with the present invention.

Referring now to FIG. 3 of the drawings, roller 40 is shown having a surface 42 which is the outer surface of a weld bead cladding, the edge of which is shown at point 44. Weld bead cladding 44 is, as described, preferably from about 0.13 cm to about 1.30 cm in thickness. Prior to heat treatment of weld cladding layer 44, cladding 44 is machined to a uniform smooth surface using conventional metal shaping techniques, or if the diameter of cladding layer 44 is uniform within tolerance of ±0.32 cm, heat treatment can be performed with cladding 44 in the as-deposited condition.

Roll 40 is preferably preheated to approximately 20° C. to about 370° C. prior to heat treatment of cladding 44 which helps control the rate of heating and cooling of cladding 44, prevents thermal shock and reduces stress of cladding 44. Roll 40 is supported on journal 46 and end 48 is attached to variable speed rotating drive 50. End 52 of journal 51 is attached to non-driven tail stock 54. A number of means of producing relative movement of roll 40 will be appreciated by those skilled in the art. That is, the heat source or the roller or both can move to produce relative movement.

In the present invention, cladding layer 44 is heat treated in order to remove the sensitization areas produced by the bead welding build up as previously described. A number of heat sources can be used for this purpose such as an oxygen/fuel burner or laser or plasma or electron beam. Most preferred is the use of induction heating and, accordingly, conducting coil 56 is shown which receives an alternating current in order to progressively induction heat cladding layer 44. More specifically, in the preferred embodiment of the present invention, the surface of cladding layer 44 is scanned in the direction of arrow A as it is rotated in the direction of arrow B. Accordingly, carriage 58 is provided which moves along tract 60 in the direction of arrow A. As carriage 58 moves so does coil 56. Coil 56 may comprise a single turn or multi turn coil and preferably comprises copper winding. Coil 56 is supported in position about the central axis of roll 40. Carriage 58 can move at a variable rate of speed along the length of roll 40 in order to control the area and rate of surface scanning, i.e. heat treatment.

A process controller 61 is provided which can be used to preset the scanning rate along the length of roll 40. It will be appreciated that near the ends of roll 40 an "end of body effect" is present which results in different heat input and heat loss characteristics of these regions of roll 40 and that the scanning rate can be varied in these regions to compensate for these variances.

Most preferably, quench head 62 is provided adjacent to or integral with coil 56. Quench head 62 delivers a quenching media to surface 42 of cladding layer 44 such that appropriate quenching of surface 42 can be achieved immediately after a region of surface 42 has been heated by coil 56. A number of quenching media can be used such as water, air or a combination of water, air or other coolant to produce a cooling rate necessary to form the desired matrix microstructure and to control carbide formations and thereby achieve a stabilized microstructure which is substantially sensitization region free.

To those knowledgeable in the time-temperature transformation (TTT) properties of martensitic stainless steels, a suitable cooling rate from the solution anneal temperature to cause an austenite to martensite transformation is approximately 1.000 seconds to cool below 704° C. Therefore, these type materials are classified as "air-hardenable" alloys and therefore the quenching referred to previously is generally achieved in an air (still or propelled) media. Alloying elements can shift the transformation curve, thereby either increasing or decreasing the time allowed to achieve desired transformation. In the case of caster rolls, the cross-sectional mass is generally sufficient to cause self-quenching of the overlayed surface.

Adjacent quench head 62, temper coil 64 is provided which is again a single or multi turn induction coil which scanning rate is controlled with controller 61. Temper coil 64 is provided in order to temper layer 44 following heat treatment by induction coil 56 and quench head 62. Temper coil 64 is optional and coil 56 alone can be used both for initial heat treatment of layer 44 and a subsequent tempering operation.

Coil 56 (and coil 64 where provided) can be split ring coils. Preferably, coil 56 (and coil 64 where provided) can comprise a single coil with roll 40 being placed in the center of the coil and spaced apart therefrom a predetermined distance.

Since the spacing between surface 42 and the coils is important, as will be more fully explained hereinafter, it may be necessary to provide a dedicated coil for each roll diameter, i.e. an induction coil having an internal diameter sufficient to properly receive the roll. It is most preferred that coil carriage 68 be configured such that interchangeable induction coils having the proper internal diameter can be quickly attached to carriage arm 68.

In accordance with the method of the present invention, caster roll 40 is weld cladded with an appropriate material, for example as shown in FIG. 2 of the drawings. The cladding is then heated to a temperature generally exceeding 870° C. and preferably between 870° C. to 1260° C. It is well known that these temperatures exceed the martensitic to austenitic transition temperature of the cladding material. Most preferably, roll 40 having bead welded layer 44 is positioned such that relative movement between a heat source, illustrated in FIG. 3 as induction coil 56, and surface 42 of roll 40 can be attained.

As stated, a number of devices can be used to achieve relative movement. Preferably the relative movement should be not only a scanning movement along the length of roll 40, but also rotational. In any event, it is critical in the invention that all surface areas of surface 42 receive the necessary heat treatment for reducing sensitization zones as provided in the present invention. A segmental approach is preferred, that is, small regions, for example having a width of approximately 1.3 cm to about 7.6 cm in circumscribing roll 40, are simultaneously heated and then quenched. Most preferably, however, the present invention provides for incremental surface heating of an area from about 122 to about 390 square centimeters.

Where the heat source is an induction coil as illustrated in FIG. 3, layer 44 should be heated to between about 870° C. and 1260° C. by providing an alternating current with frequency of about 300 Hz to about 5 KHz to induction coil 56 at a power of from about 0.5 KW/cm$^2$ to about 2.0 KW/cm$^2$. Under these conditions, the entire thickness of layer 44 will be within the preferred temperature range. Heating of the underlying roll, that is under layer 44, is limited to a depth of about 0.1 cm to about 2.5 cm. After approximately 1 to about 60 seconds, quench head 62 quenches the region of layer 44 which has been inductively heated by induction coil 56. Where air is the quenching media, it will typically be applied at ambient temperature for about 5 to about 360 seconds which will reduce the temperature of layer 44 to about 315° C. to about 648° C. in about 5 to 360 seconds. Thus, in this manner the surface cladding of roll 40 is heat treated by means of circumferential induced current flows to a controlled depth. Layer 44 is thereby solution annealed for a sufficient time and temperature such that upon cooling at a suitable rate the microstructure of layer 44 is predominately not sensitized particularly in the reheat regions adjacent to surface cladding interbead or overlap areas to greatly reduce susceptibility of corrosive attack and subsequent crack propagation at surface 42. Again, it is most preferred that the heat treatment of the roll surface be conducted in a progressive manner by an inductive coil scanning along the length of the roll body. A most preferred microstructure is a martensitic microstructure in the case of stainless steel.

It will be appreciated, then, that the method of the invention does not adversely affect the dimensional accuracy of the finish machined roll. Most preferably the cladding is provided to a sufficient depth such that a used roll surface can be machined to a smaller size, generally not exceeding 1.3 cm of diameter reduction, without the need to reheat treat the working surface. The roller cladding should have a sufficient depth such that the strength and toughness of the heat-affected zone (HAZ) which lies below the fusion zone between the surface cladding and base roll material is optimized for the intended application involving low cycle fatigue and high bending stresses.

The present invention may also be used for the treatment of used caster roll surfaces where it is determined that elevated temperatures encountered in service have caused microstructural instability and sensitization to occur on used caster roll surfaces and where it is determined that exposure to elevated temperature in service has caused softening of the roll working surface, i.e., re-hardening the roll surface to avoid premature wear.

It is to be understood that the cladding formed in the present invention is in compression rather than in tension, thereby making the working surface of the roll more resistant to crack nucleation and propagation under fatigue loading.

Finally, it is to be understood that the process of the present invention provides a heat treatment that isolates thermal effects to the roller body and avoids scale formation and decarburization on the finished machined surfaces of the bearing journals.

Thus, it is apparent that there has been provided in accordance with the invention a method and apparatus that fully satisfies the objects, aims and advantages set forth above. While the invention has been described in connection with specific embodiments thereof, it is evident that many alternatives, modifications, and variations will be apparent to those skilled in the art in the light of the foregoing description. Also, it is apparent that any of the embodiments could be used with any other embodiment(s) depending on the requirements. Accordingly, it is intended to embrace all such alternatives, modifications and variations that fall within the spirit and broad scope of the appended claims.

What is claimed is:

1. A method of making a corrosion resistant caster roll useful for containing and supporting a solidifying slab of metal in a continuous casting machine, comprising steps of:

(a) cladding a roll body by welding at least one bead of stainless steel cladding material about an outer surface of the roll body;

(b) shaping the cladding to have a uniform smooth surface;

(c) heating the cladding to a temperature that is sufficient to cause chromium carbides that precipitated during step (a) to dissolve into the cladding material, thereby eliminating sensitized regions, that would otherwise be susceptible to corrosion attack, from the cladding, and wherein step (c) is performed so as to limit penetration of heat into the underlying roll body so that the mechanical properties of the underlying roll body are not compromised by tempering it throughout its entire radius, steps (b) and (c) being performed in no particular order; and (d) cooling the cladding.

2. A method according to claim 1, wherein step (b) is performed by machining the cladding.

3. A method according to claim 1, wherein step (c) is performed by heating the cladding for a limited period of time that limits penetration of heat into the underlying roll body.

4. A method according to claim 3, wherein step (c) is performed by heating the cladding for a period of time that is 60 seconds or less.

5. A method according to claim 1, wherein penetration of heat into the underlying roll body is limited to a depth that does not exceed 2.5 cm.

6. A method according to claim 1, wherein step (a) is performed with a stainless steel material that is selected from the group consisting of 410 stainless, 414 stainless, 420 stainless and 423 stainless.

7. A method of making a cladded caster roll that is useful for containing and supporting a solidifying slab of metal in a continuous casting machine, comprising steps of:

(a) cladding a roll body by welding at least one bead of stainless steel cladding material about an outer surface of the roll body, said cladding material having a martensitic phase microstructure;

(b) heating the cladding to a temperature and for a period of time that is sufficient to cause its phase microstructure to become austenitic and that is great enough to permit chromium carbides that precipitated during step (a) to dissolve into the cladding material, but that is not so long as to cause penetration of heat into the underlying roll body to the extent that the mechanical properties of the underlying roll body would be compromised by tempering it throughout its entire radius; and (c) cooling the cladding so that it assumes a martensitic phase microstructure.

8. A method according to claim 7, wherein step (b) is performed by heating the cladding for a period of time that is 60 seconds or less.

9. A method according to claim 7, wherein penetration of heat into the underlying roll body is limited to a depth that does not exceed 2.5 cm.

10. A method according to claim 7, wherein step (a) is performed with a stainless steel material that is selected from the group consisting of 410 stainless, 414 stainless, 420 stainless and 423 stainless.

11. A method of reconditioning a caster roll that is useful for containing and supporting a solidifying slab of metal in a continuous casting machine, comprising steps of:

(a) removing a degraded cladding from a used caster roll so as to expose an underlying roll body;

(b) cladding the roll body by welding at least one bead of stainless steel cladding material about an outer surface of the roll body;

(c) shaping the cladding to have a uniform smooth surface;

(d) heating the cladding to a temperature that is sufficient to cause chromium carbides that precipitated during step (a) to dissolve into the cladding material, thereby eliminating sensitized regions, that would otherwise be susceptible to corrosion attack, from the cladding, and wherein step (c) is performed so as to limit penetration of heat into the underlying roll body so that the mechanical properties of the underlying roll body are not compromised by tempering it throughout its entire radius, wherein steps (c) and (d) are performed in no particular order; and (e) cooling the cladding.

12. A method of reconditioning a caster roll that is useful for containing and supporting a solidifying slab of metal in a continuous casting machine, comprising steps of:

(a) removing a caster roll from a continuous casting machine;

(b) heating an outer cladding of the caster roll to a temperature that is sufficient to cause chromium carbides that precipitated during use in the continuous casting machine to dissolve into the cladding material, thereby eliminating sensitized regions, that would otherwise be susceptible to corrosion attack, from the cladding, and wherein step (b) is performed so as to limit penetration of heat into the underlying roll body so that the mechanical properties of the underlying roll body are not compromised by tempering it throughout its entire radius;

(c) cooling the cladding; and (d) returning the caster roll to service in a continuous casting machine.

13. A method of reconditioning a cladded caster roll that is useful for containing and supporting a solidifying slab of metal in a continuous casting machine, comprising steps of:

(a) removing a caster roll from a continuous casting machine;

(b) heating a cladding of the caster roll to a temperature and for a period of time that is sufficient to cause its phase microstructure to become austenitic, and that is great enough to condition the cladding in order to counteract softening that has occurred during use, but that is not so long as to cause penetration of heat into the underlying roll body to the extent that the mechanical properties of the underlying roll body would be compromised by tempering it throughout its entire radius;

(c) cooling the cladding so that it assumes a martensitic phase microstructure, in order to harden the cladding; and (d) returning the caster roll to service in a continuous casting machine.

14. A method of reconditioning a caster roll that is useful for containing and supporting a solidifying slab of metal in a continuous casting machine, comprising steps of:

(a) removing a caster roll from a continuous casting machine;

(b) removing a degraded portion of an outer cladding of the caster roll;

(c) heating the exposed underlying portion of the outer cladding of the caster roll to a temperature that is sufficient to cause chromium carbides that precipitated during use in the continuous casting machine to dissolve into the cladding material, thereby eliminating sensitized regions, that would otherwise be susceptible to corrosion attack, from the cladding, and wherein step (c) is performed so as to limit penetration of heat into the underlying roll body so that the mechanical properties of the underlying roll body are not compromised by tempering it throughout its entire radius;

(d) cooling the cladding; and (e) returning the caster roll to service in a continuous casting machine.

* * * * *